US007894362B2

(12) United States Patent
Effenberger

(10) Patent No.: US 7,894,362 B2
(45) Date of Patent: Feb. 22, 2011

(54) PASSIVE OPTICAL NETWORK TOPOLOGY ESTIMATION

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 166 days.

(21) Appl. No.: 12/027,389

(22) Filed: Feb. 7, 2008

(65) Prior Publication Data

US 2008/0267089 A1    Oct. 30, 2008

Related U.S. Application Data

(60) Provisional application No. 60/915,041, filed on Apr. 30, 2007.

(51) Int. Cl.
*H04J 1/16* (2006.01)
(52) U.S. Cl. .................................................... 370/252
(58) Field of Classification Search ................ 370/254, 370/468, 230, 437, 442, 412, 278, 252.39, 370/395.2, 395.3, 395.4, 295.41, 390, 421, 370/395.41, 252; 398/72, 38, 27, 58, 67, 398/71, 72.38
See application file for complete search history.

(56) References Cited

U.S. PATENT DOCUMENTS

| 6,791,984 | B2 * | 9/2004  | Shimada et al. .......... 370/395.4 |
| 7,434,249 | B2 * | 10/2008 | Park et al. .................... 725/129 |
| 7,489,869 | B2 * | 2/2009  | Kazawa et al. ................ 398/71 |
| 7,564,852 | B2 * | 7/2009  | Das et al. ................ 370/395.41 |
| 2005/0069318 | A1 | 3/2005 | Lee et al. |
| 2006/0127091 | A1 | 6/2006 | Yoo et al. |
| 2007/0140689 | A1 * | 6/2007 | Haran .......................... 398/27 |
| 2007/0292132 | A1 * | 12/2007 | Zhao et al. ..................... 398/63 |

FOREIGN PATENT DOCUMENTS

| CN | 1725721 | 1/2006 |
| CN | 1790951 | 6/2006 |
| EP | 1519616 A2 | 3/2005 |

OTHER PUBLICATIONS

Foreign communication from a related counterpart application—International Search Report and Written Opinion, PCT/CN2008/070788, Aug. 7, 2008, 7 pages.

* cited by examiner

*Primary Examiner*—Chi H Pham
*Assistant Examiner*—Alexander Boakye
(74) *Attorney, Agent, or Firm*—Conley Rose, P.C.; Grant Rodolph

(57) ABSTRACT

An apparatus comprising an optical line terminal (OLT) in communication with a plurality of optical network terminals (ONTs) via an optical distribution network (ODN), and a passive optical network (PON) topology estimator coupled to the OLT or at least one of the ONTs, wherein the PON topology estimator is configured to model a PON topology. Also disclosed is an apparatus comprising at least one processor configured to implement a method comprising defining a PON topology comprising a plurality of network parameters, a plurality of component parameters, and at least one relationship between the network parameters and the component parameters, acquiring values for the network parameters, and determining the component parameters using the network parameters and the mathematical equations.

18 Claims, 5 Drawing Sheets

PASSIVE OPTICAL NETWORK TOPOLOGY ESTIMATION

CROSS-REFERENCE TO RELATED APPLICATIONS

The present application claims priority to U.S. Provisional Patent Application Ser. No. 60/915,041 filed Apr. 30, 2007 by Frank J. Effenberger and entitled, "PON Topology Estimation," which is incorporated herein by reference as if reproduced in its entirety.

STATEMENT REGARDING FEDERALLY SPONSORED RESEARCH OR DEVELOPMENT

Not applicable

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network terminals (ONTs) at the customer premises. The ODN comprises optical fibers, couplers, splitters, distributors, filters, and other passive optical devices, which connect the OLT to the ONTs. The quantity of ONTs and the specific configuration of passive optical components determine the PON's topology.

Various optical properties can be measured at the OLT and the ONTs to monitor optical layer operations in the PON. These optical properties comprise insertion losses and transmission delays between the OLT and the ONTs. The optical properties quantify the problems in the PON, but do not provide any specific information regarding problems with specific PON components. For PON topologies where relatively few ONTs are connected to the OLT with one or few passive optical components, problems within the PON components are relatively easy to identify. However, for PON topologies where many ONTs are connected to the OLT with a complex branching ODN, identifying problems with individual components becomes exceedingly difficult, if not impossible.

SUMMARY

In one embodiment, the disclosure includes an apparatus comprising an OLT in communication with a plurality of ONTs via an ODN, and a PON topology estimator coupled to the OLT or at least one of the ONTs, wherein the PON topology estimator is configured to model a PON topology.

In another embodiment, the disclosure includes an apparatus comprising at least one processor configured to implement a method comprising defining a PON topology comprising a plurality of network parameters, a plurality of component parameters, and at least one relationship between the network parameters and the component parameters, acquiring values for the network parameters, and determining the component parameters using the network parameters and the mathematical equations.

In yet another embodiment, the disclosure includes a method comprising defining a model for a PON topology, defining a plurality of network parameters in the model that represent a plurality of measurable aspects of the PON, defining a plurality of component parameters in the model that are not measurable within the PON, and defining the relationship between the network parameters and the component parameters.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for modeling a PON topology. The PON topology model includes a plurality of component parameters and a plurality of network parameters. The network parameters may reflect the properties of the entire PON system, which may be measurable. In contrast, the component parameters may represent the properties of individual PON components, which may not be individually measurable. The PON topology model also includes a plurality of mathematical equations that relate the component parameters to the network parameters. The mathematical equations may be solved using standard solution methods, thereby yielding values for the individual immeasurable component parameters. Once the immeasurable component parameters are known, the PON topology model may be used to identify and provide information regarding the individual PON components.

Figure 1:
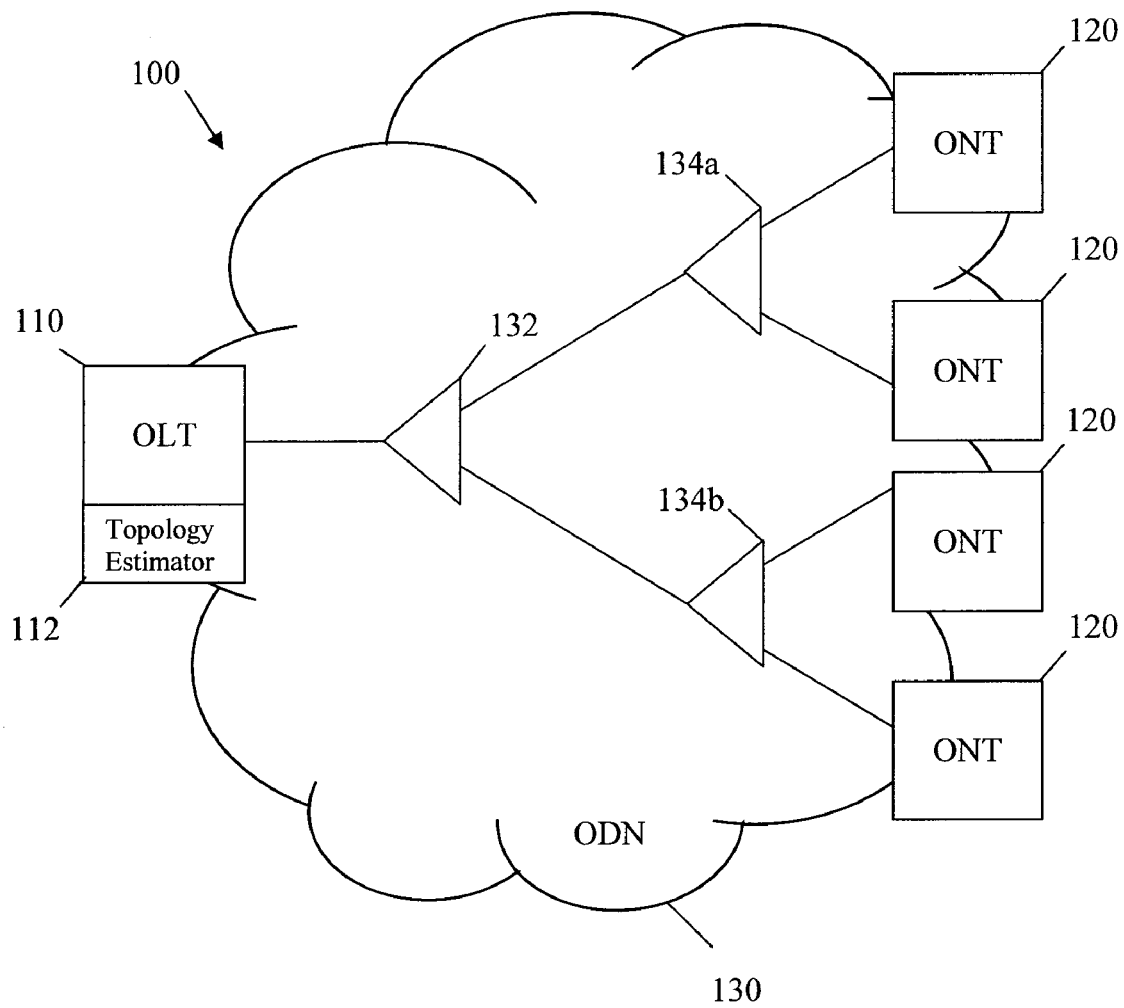
FIG. 1 is a schematic diagram of an embodiment of a PON system.

FIG. 1 illustrates one embodiment of a PON 100. The PON 100 comprises an OLT 110, a plurality of ONTs 120, and an ODN 130. The PON 100 is a communications network that does not require any active components to distribute data between the OLT 110 and the ONTs 120. Instead, the PON 100 uses the passive optical components in the ODN 130 to distribute data between the OLT 110 and the ONTs 120. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 110. The OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment, the OLT 110 may comprise a transmitter and a receiver, as explained in detail below. When the other network is using a protocol, such as Ethernet or SONET/SDH, that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

Another component of the PON 100 may be the ONTs 120. The ONTs 120 may be any devices that are configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment, the ONTs 120 may comprise an optical transmitter configured to send optical signals to the OLT 110. Additionally, the ONTs 120 may comprise an optical receiver configured to receive optical signals from the OLT 110 and a converter that converts the optical signal into electrical signals for the customer, such as signals in the ATM or Ethernet protocol. The ONTs 120 may also comprise a second transmitter and/or receiver that may send and/or receive the electrical signals to a customer device. In some embodiments, ONTs 120 and optical network units (ONUs) are similar, and thus the terms are used interchangeably herein. The ONTs 120 are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment, such as splitters 132, 134a, and 134b. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONTs 120. The ODN 130 typically extends from the OLT 110 to the ONTs 120 in a branching configuration as shown in FIG. 1, but may be configured in any of a plurality of alternative configurations, as explained in detail below.

The OLT 110 may also comprise a PON topology estimator 112. The PON topology estimator 112 may acquire values for the measurable network parameters from the OLT 110, the ONTs 120, or combinations thereof. The PON topology estimator 112 may use a plurality of mathematical equations from the PON topology model to relate the measurable network parameters to the immeasurable component parameters. Although the PON topology estimator 112 is shown as part of the OLT 110 in FIG. 1, the PON topology estimator 112 may alternatively be part of at least one of the ONTs 120, or the PON topology estimator 112 may be a freestanding component.

The specific arrangement of components within the ODN may be referred to as the PON topology. FIG. 1 illustrates one example of a PON topology comprising three splitters 132, 134a, and 134b connected to each other, the OLT 110, and ONTs 120 by optical fibers as shown. In defining the PON topology, the various components within the PON may be classified into a plurality of levels based on their relative positioning within the ODN. For example, a first level may be defined as those components connected directly to the OLT 110, and a second level may be defined as those components connected directly to the ONTs 120. In such a case, the first level of the PON topology shown in FIG. 1 comprises splitter 132 and the second level comprises splitters 134a and 134b. If desired, other levels could be defined as well, such as a third level comprising interior components that are not directly connected to the OLT 110 or the ONTs 120.

In some embodiments, a specific PON topology may be defined by more than just the number of components and the number of levels. Specifically, it will be appreciated that for relatively complex PONs, there may be a plurality of different PON topologies comprising the same number of PON components and/or the same number of levels. For example, FIG. 1 illustrates a PON topology with three splitters and two levels. However, an alternative PON topology may exist in which the optical splitter 134a may be connected downstream to three of the ONTs 120 via three separate optical fibers, and the optical splitter 134b may be connected downstream to the fourth ONT 120 via a fourth optical fiber. It will be appreciated that a plurality of other, alternative PON topologies exist and/or may be created.

Figure 2A:
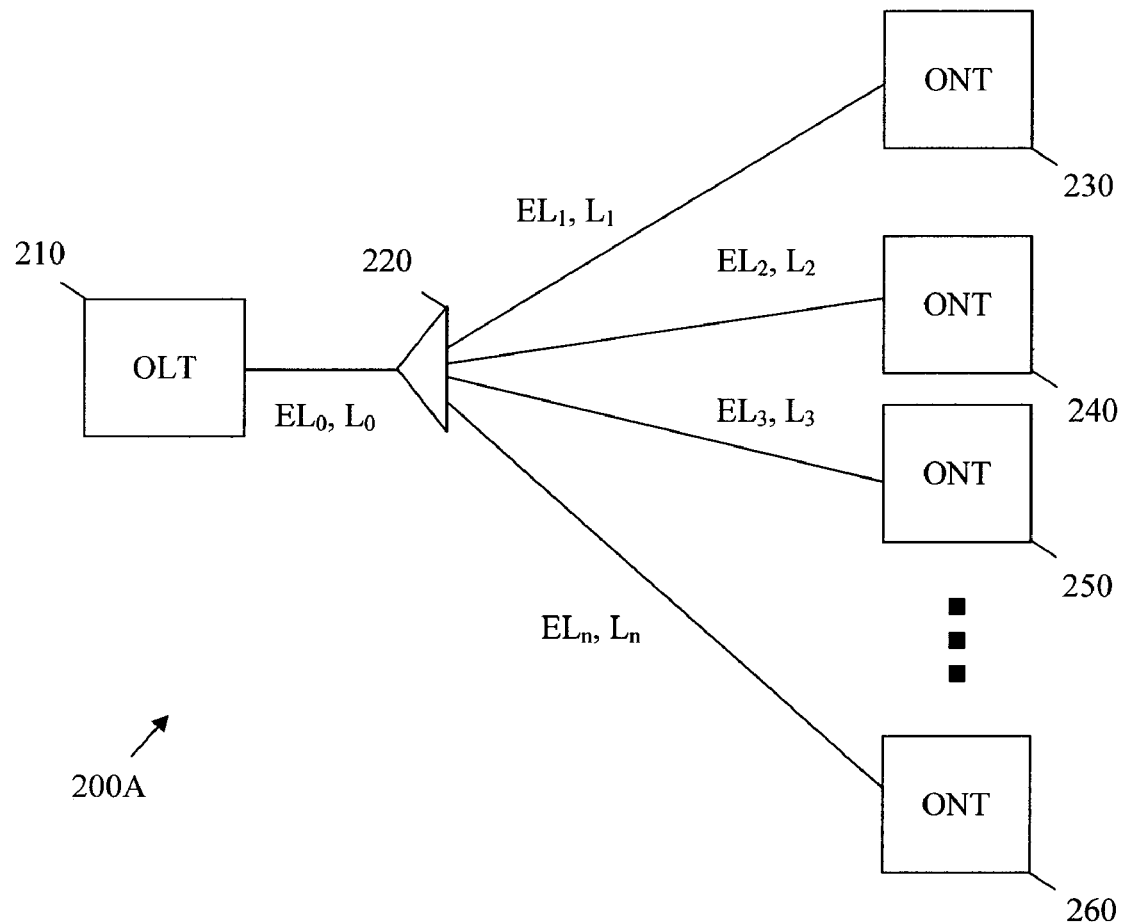
FIG. 2A is a schematic diagram of an embodiment of a PON topology model.

FIG. 2A illustrates a single-level PON topology model 200A. Specifically, the PON topology model 200A comprises an OLT 210, a splitter 220, and N ONTs, where N is an integer. For ease of reference, four ONTs, 230, 240, 250, and 260 are shown in FIG. 2A. The PON topology model 200A may also comprise N+1 optical fibers: one optical fiber that connects the OLT 210 to the splitter 220, and N optical fibers that each connects the splitter 220 to one of any of the N ONTs. The PON topology model 200A may be used by the PON topology estimator 112 to relate the component parameters to the network measurements.

The PON topology model 200A comprises a plurality of component parameters. The component parameters may represent immeasurable or difficult to measure properties related to the operations of the individual PON components, such as the OLT 210, the ONTs 230, 240, 250, and 260, the fibers that connect the splitter 220 to the OLT 210, and the fibers that connect the splitter 220 to the N ONTs. For instance, the component parameters may comprise signal losses incurred in transmitting data across each optical fiber, signal losses incurred at the OLT 210, and signal losses incurred at the N ONTs. Specifically, the component parameters may comprise N+1 fiber loss parameters that represent the fiber-introduced losses at the N+1 optical fibers shown in FIG. 2A, as well as N+1 excess loss parameters that represent signal losses introduced at the N ONTs and at the single OLT 210.

Although, in some embodiments, the component parameters of the PON topology model 200A may be obtained using various measurement techniques and equipment, using such measurement techniques and equipment at each individual component of the PON may be difficult. For example, using additional equipment for measuring the excess loss parameters at the OLT 210 and at each one of the N ONTs may not be feasible. Moreover, it may be difficult, if not impossible, to measure other component parameters of the PON topology model 200A. For example, it may be difficult to tap into the fibers of the PON, which may be installed underground, to measure the fiber loss parameters. Instead, the component parameters of the PON topology model 200A may be obtained by measuring the network parameters and relating the network parameters to the component parameters.

The PON topology model 200A also comprises a plurality of network parameters. In contrast with the component parameters, the network parameters may reflect properties of the PON system that may be measured. The network parameters may be measured using the PON topology estimator at the OLT 210 or at any of the N ONTs. For instance, the network parameters may comprise measurements of path losses between the OLT 210 and the N ONTs. Specifically, the PON topology estimator may acquire the path losses for downstream signals that are transmitted at one wavelength, as well as the path losses for upstream signals that are transmitted at a different wavelength. For example, the PON topology estimator may acquire the path losses for downstream signals that are transmitted at a wavelength equal to about 1490 nm, and for upstream signals that are transmitted at a wavelength equal to about 1310 nm. In other embodiments, the PON topology estimator may acquire the path losses for downstream signals that are transmitted at a different wavelength. For example, in a wavelength division multiplexed PON (WPON), the PON topology estimator may acquire the path losses at different course division multiplexed (CWDM) wavelengths or at different dense division multiplexed (DWDM) wavelengths.

In some embodiments, the path losses for downstream and upstream signals may be measured by detecting a received signal's strength at the OLT 210 or at the N ONTs. For example, the path loss for a downstream signal may be measured by recording the strength of the transmitted signal at the OLT 210, measuring the strength of the received signal at one of the N ONTs, and subtracting the received signal strength from the transmitted signal strength. Similarly, the path loss for an upstream signal may be measured by recording the strength of the transmitted signal at one of the N ONTs, measuring the strength of the received signal at the OLT 210, and subtracting the received signal strength from the transmitted signal strength. Once measured, the path losses may be communicated to the PON topology estimator.

Alternatively, the path losses may be measured by detecting the strength of a signal's reflection. The path loss for a downstream signal may be measured by transmitting a signal from the OLT 210, and receiving back the reflected signal at the OLT 210. The signal may be received at the OLT 210 after undergoing reflection from one of the N ONTs. The path loss corresponding to the signal roundtrip between the OLT 210 and one of the N ONTs may be obtained by subtracting the received reflected signal strength from the transmitted signal strength. Extra losses of the signal strength in the fibers or any passive optical components that connect the OLT 210 and the N ONTs may also be accounted for by subtracting the extra signal losses or estimates of the extra signal losses as well as the reflected signal strength from the transmitted signal strength. The extra signal losses or the estimates of the extra signal losses may be obtained prior to measuring the path loss using numerical models or additional measurements. The path loss for the downstream signal may then be calculated by dividing the roundtrip path loss by two. Similarly, the path loss for an upstream signal may be measured by transmitting a signal from one of the N ONTs, receiving back the reflected signal at the same ONT, calculating the difference between the transmitted signal strength and the reflected signal strength in addition to any extra signal losses in the system, and dividing the difference by two.

The network parameters may also comprise roundtrip distance measurements between the OLT 210 and the N ONTs. The roundtrip distances may be acquired by measuring the roundtrip transmission delays between the OLT 210 and the N ONTs. In an embodiment, the roundtrip transmission delays may be measured by estimating the downstream and upstream transmission delays between the OLT 210 and each of N ONTs using synchronized system clocks. The synchronized system clocks may be used to record the time when a signal is transmitted from the OLT 210 and the time when the signal is received by one of the N ONTs. The downstream transmission delay from the OLT 210 to the ONT may be estimated as the difference between the time of the signal transmission and the time of the signal reception. Similarly, the upstream transmission delay may be estimated using the synchronized system clocks. The roundtrip transmission delays between the OLT 210 and the N ONTs may then be equal to the sum of the downstream transmission delays and the upstream transmission delays. Specifically, using the synchronized system clocks, a timestamp may be transmitted from the OLT 210 to each of the N ONTs and transmitted back from the ONT to the OLT 210. The timestamp may be used to estimate the roundtrip transmission delays assuming substantially equal downstream and upstream transmission delays. The estimated roundtrip transmission delays between the OLT 210 and the N ONTs may be multiplied by the value of the speed of light to obtain the roundtrip distance measurements.

In some embodiments, the PON topology estimator may acquire OTDR or OFDR measurements. In OTDR, a test signal comprising a light pulse may be transmitted down the fiber, reflected at some point down the fiber, and then measured at the same location from which the pulse was transmitted. The delay time between transmitting and receiving the pulse may be measured and used to calculate the roundtrip distance of the pulse. In OFDR, a test signal comprising various optical wavelengths may be transmitted, reflected, and then received in a similar manner to the OTDR. The various wavelength components of the reflected signal may then be processed using Fourier transform techniques to calculate the roundtrip distance. The OTDR and the OFDR may comprise other types of measurements, for example, optical dispersion measurements, that may be related to the component parameters of the PON topology model 200A In the PON topology model 200A, the network parameters may comprise N path loss measurements between the OLT 210 and the N ONTs for downstream communications, and N path loss measurements for upstream communications. The network parameters of the PON topology model 200A may also include N roundtrip distance measurements between the OLT 210 and each of the N ONTs. Hence, the PON topology model 200A may comprise a total of 3N network parameters comprising a combination of N path loss measurements for downstream communications, N path loss measurements for upstream communications, and N roundtrip distance measurements.

Additionally, each fiber loss parameter of the PON topology model 200A may comprise a product of a fiber length parameter and a fiber loss-per-unit-length parameter. The fiber length parameter may represent the fiber physical length. The fiber loss-per-unit-length parameter may represent a signal loss introduced at a unit length of the fiber. Since the total number of optical fibers in the PON topology is equal to N+1, an equal number of fiber length parameters may be assigned for each fiber in the PON topology model 200A. Furthermore, the fiber loss-per-unit-length parameter may comprise one of two component parameters: a downstream fiber loss-per-unit-length parameter and an upstream fiber loss-per-unit-length parameter. The downstream fiber loss-per-unit-length parameter may represent a loss introduced at a unit length of the fiber for a signal transmitted downstream from the OLT 210 to one of the ONTs. The upstream fiber loss-per-unit-length parameter may represent a loss introduced at a unit length of the fiber for a signal transmitted upstream from one of the ONTs to the OLT 210. The component parameters in the PON topology model 200A may also comprise N+1 excess loss parameters. The N+1 excess loss parameters may represent excess losses introduced at the N ONTs and at the OLT 210. Consequently, the PON topology model 200A may comprise a total of 2N+4 component parameters comprising a combination of N+1 excess loss parameters, N+1 fiber length parameters, and two fiber loss-per-unit-length parameters.

The PON topology model 200A also comprises a plurality of mathematical equations correlating the component parameters and the network parameters. The mathematical equations define the relationship between the component parameters and the network parameters, and thus will be dependent on the specific PON topology. If there are a sufficient number of equations for the unknown variables, the mathematical equations may be solved to obtain values for the component parameters. For example, in the PON topology shown in FIG. 2A, the mathematical equations may comprise a system of 3N mathematical equations that relate the 2N+4 component parameters and the 3N network parameters. The system of 3N mathematical equations may comprise three sets of N equations, which may be illustrated as the following three equations:

$$Ld_i = Fd(L_0 + L_i) + EL_0 + EL_i \quad (1)$$

$$Lu_i = Fu(L_0 + L_i) + EL_0 + EL_i \quad (2)$$

$$D_i = 2(L_0 + L_i). \quad (3)$$

Equation (1) may comprise N instances of equations, wherein each equation may relate each of the N path loss measurements for downstream communications, $Ld_i$, to a sum of a combined downstream fiber loss parameter, Fd $(L_0+L_i)$, and a combined excess loss parameter $(EL_0+EL_i)$, where i may be any integer from 1 to N. The combined downstream fiber loss parameter, Fd $(L_0+L_i)$, may represent the total signal losses introduced at the optical fibers connecting the OLT 210 and one of the N ONTs for downstream communications. The combined downstream fiber loss parameter may comprise the product of the downstream fiber loss-per-unit-length parameter, Fd, and a total fiber length parameter, $(L_0+L_i)$. The total fiber length parameter, $(L_0+L_i)$, may comprise the sum of the fiber length parameter, $L_0$, that connects the OLT 210 to the splitter 220 and the fiber length parameter, $L_i$, that connects the splitter 220 to one of the ONTs. The N+1 fiber length parameters in the PON topology model 200A may be paired in N groups that represent N total fiber length parameters, $(L_0+L_i)$. Each group may correspond to the length of the common fiber that connects the OLT 210 to the splitter 220 and the length of the fiber that connects the splitter 220 to one of the N ONTs. In FIG. 2A, for example, four fiber length parameters are shown: $L_1$, $L_2$, $L_3$, and $L_n$, which correspond to four fibers connecting the optical splitter 220 to the four ONTs, 230, 240, 250, and 260, respectively. The subscript n in FIG. 2A is an integer that may be equal to any number from 1 to N and designates one of the N components in the PON topology model 200A. Also shown in the FIG. 2A is a fifth common fiber length parameter, $L_0$, corresponding to the fiber that connects the OLT 210 to the optical splitter 220. The five fiber length parameters may be paired in four groups that represent four total fiber length parameters, $(L_0+L_1)$, $(L_0+L_2)$, $(L_0+L_3)$, and $(L_0+L_n)$, which couple the OLT 210 to the ONTs, 230, 240, 250, and 260, respectively.

In another embodiment, the combined downstream fiber loss parameter may comprise the sum of the fiber loss parameter corresponding to the fiber that connects the OLT 210 to the splitter 220, Fd $L_0$, and the fiber loss parameter corresponding to the fiber that connects the splitter 220 to one ONT of the N ONTs, Fd $L_i$. The fiber loss parameter, Fd $L_0$, may comprise the product of the downstream fiber loss-per-unit-length parameter, Fd, and the fiber length parameter, $L_0$. The fiber loss parameter, Fd $L_i$, may comprise the product of the downstream fiber loss-per-unit-length parameter, Fd, and the fiber length parameter, $L_i$.

The combined excess loss parameters, $(EL_0+EL_i)$, may comprise the sum of the excess loss parameter, $EL_i$, at one ONT and the excess loss parameter at the OLT 210, $EL_0$. The PON topology model 200A may comprise N+1 excess loss parameters corresponding to the N ONTs and the OLT 210. The N+1 excess loss parameters may be paired in N groups that represent N total excess loss parameters, $(EL_0+EL_i)$. Each group may correspond to the loss introduced at the OLT 210 and the loss introduced at one of the N ONTs. In FIG. 2A, four excess loss parameters are shown. $EL_1$, $EL_2$, $EL_3$, and $EL_n$, which correspond to four ONTs, 230, 240, 250, and 260, respectively. Also shown in the FIG. 2A is a fifth excess loss parameter, $EL_0$, corresponding to the OLT 210. The five excess loss parameters may be paired in four groups that represent four combined excess loss parameters, $(EL_0+EL_1)$, $(EL_0+EL_2)$, $(EL_0+EL_3)$, and $(EL_0+EL_n)$, which correspond to the pairs comprising the OLT 210 and the ONT 230, the OLT 210 and the ONT 240, the OLT 210 and the ONT 250, and the OLT 210 and the ONT 260, respectively.

Equation (2) may also comprise N instances of equations, wherein each equation may relate each of the N path loss measurements for upstream communications, $Ld_i$, to a sum of a combined upstream fiber loss parameter, Fu $(L_0+L_i)$, and the combined excess loss parameters $(EL_0+EL_i)$, in a manner similar to equation (1). However, in equation (2), the combined upstream fiber loss parameter, Fu $(L_0+L_i)$, may represent the total signal losses introduced at the optical fibers connecting the OLT 210 and one of the N ONTs for upstream communications. The combined upstream fiber loss parameter may comprise the product of the upstream fiber loss-per-unit-length parameter, Fu, and the total fiber length parameter, $(L_0+L_i)$. Equation (3) may also comprise N instances of equations, where each equation may relate each of the N roundtrip distance measurements, Di, to twice the value of the total fiber length parameter, $(L_0+L_i)$.

If the total number of 3N network parameters may be larger than or equal to the total number of 2N+4 component parameters, the N instances of equations in equation (1), equation (2), and equation (3) may be solved simultaneously to obtain the 2N+4 component parameters in the PON topology model 200A. The total number of 3N network parameters may be larger than or equal to the total number of 2N+4 component parameters, when the value of N is larger than three. Thus, 3N equations may comprise at least twelve equations associated with twelve network parameters. Furthermore, the PON topology model 200A may comprise at least four ONTs connected to the splitter 220 via four optical fibers.

The 3N equations may be solved simultaneously using standard solution methods or any solution methods that may be used to obtain the values of the component parameters from the network parameters. The standard solution methods may include statistical solution methods, linear and non-linear regression techniques, least error solutions, or any other solution methods that may be used to solve the component parameters. For instance, using the least error solution, the obtained values of the component parameters may correspond to an acceptable fitting error for the measured values of the network parameters. In other words, using the least error solution, the obtained values of the component parameters may correspond to measurement values that are substantially equal to the acquired values of the network parameters.

In the PON topology model 200A, the individual values of the combined component parameters may be solved separately to identify operational aspects or problems in separate components of the PON topology. Specifically, the individual values of the combined excess loss parameters, the total fiber length parameters, the downstream fiber loss-per-unit-length parameters, and the upstream fiber loss-per-unit-length parameters may be solved separately. Furthermore, the separate values for the total fiber length parameters and the downstream fiber loss-per-unit-length parameters may be used to obtain separate values for the combined downstream fiber loss parameters. The separate values for the total fiber length parameters and the upstream fiber loss-per-unit-length parameters may be used to obtain separate values for the combined upstream fiber loss parameters.

The separate values for the combined excess loss parameters may be used to identify the operating conditions in each of the N distinct pairs comprising the OLT 210 and one of the ONTs. For example, the excess loss parameter corresponding to the ONT 240 with a value that is substantially larger than zero may indicate abnormal operation conditions at the ONT 240. The separate values for the total fiber length parameters may be used to identify the physical length of each of the N distinct pairs of fibers connecting the OLT 210 to one of the ONTs through the splitter 220. The separate values for the combined downstream (or upstream) fiber loss parameters may be used to identify the operating conditions for downstream (or upstream) communications in each of the N distinct pairs of fibers connecting the OLT 210 to one of the ONTs through the splitter 220. Identifying the operating conditions in each of the N distinct pairs of fibers connecting the OLT 210 to one of the ONTs and in each of the N distinct pairs comprising the OLT 210 and one of the ONTs may facilitate locating a problem source in the PON. For example, the fiber loss parameter with a value substantially larger than zero may indicate the presence of a partial break or a complete break in the corresponding fiber.

Some individual values of the component parameters in the PON topology model 200A may not be solved separately. Specifically, in at least one of the total fiber length parameters, it may be difficult to separate the individual value of the fiber length parameter corresponding to the fiber connected to the OLT 210 from the individual value of the fiber length parameter corresponding to the fiber connected to one of the ONTs. Similarly, in at least one of the combined excess loss parameters, it may be difficult to separate the individual value of the excess loss parameter corresponding to the OLT 210 from the individual value of the excess loss parameter corresponding to one of the ONTs. Thus, it may be desirable to make some additional modifications to the PON topology model to individually solve all of the component parameters.

Figure 2B:
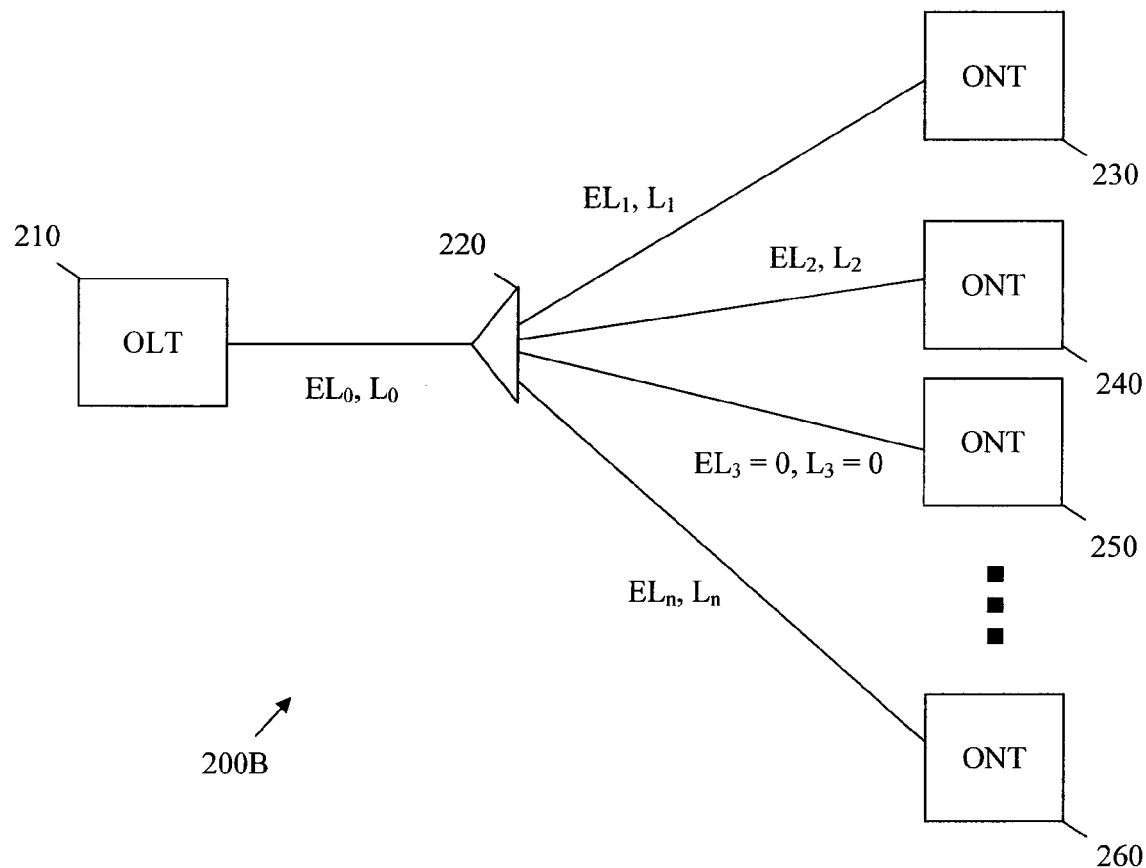
FIG. 2B is a schematic diagram of another embodiment of a PON topology model.

FIG. 2B illustrates another PON topology model 200B that may represent a modified version of PON topology of FIG. 2A. The PON topology model 200B may be used to separate the individual values of the component parameters of the PON topology model 200A. Specifically, the PON topology 200B model may be used to separate the values of the N+1 individual fiber length parameters and the N+1 individual excess loss parameters in the PON topology 200A. The values of the N+1 individual fiber length parameters may be separated by setting the value of one of the N fiber length parameters that corresponds to a fiber connected to one of the N ONTs to zero. The value of the fiber length parameter may be set equal to zero when it is assumed that the ONT may be directly connected to the splitter 220. Although such an assumption about the length of the fiber connected to the ONT is unlikely to be true, the assumption may be used as a compromise to separate the individual value of the fiber length parameter corresponding to the fiber connected to the OLT 210 and the individual values of the fiber length parameters corresponding to the fibers connected to the remaining ONTs.

By making the above assumption, the individual value of the fiber length parameter corresponding to the fiber connected to the OLT 210 may be found equal to about the sum of the actual length of the fiber connected to the OLT 210 and the actual length of the fiber connected to the ONT. On the other hand, the individual values of the fiber length parameters corresponding to the fibers connected to the remaining ONTs may be found equal to about their actual lengths. For example, in FIG. 2B, the value of the fiber length parameter corresponding to the fiber connected to ONT 250 may be set equal to zero. The individual value of the fiber length parameter that corresponds to the fiber connected to the OLT 210 may be found equal to $(L_0+L_3)$, and the individual values of the fiber length parameters corresponding to the fibers connected to ONT 230, ONT 240, and ONT 260 may be found equal to $L_1$, $L_2$, and $L_n$, respectively.

Similarly, the values of the N+1 individual excess loss parameters may be separated by setting the value of one of the N excess loss parameters that corresponds to one of the N ONTs to zero. The value of the excess loss parameter may be set equal to zero when it is assumed that the ONT may introduce no or an insignificant loss in the PON topology model 200B. In some embodiments, both the value of the fiber length parameter corresponding to the fiber connected to one of the N ONTs and the value of the excess loss parameter corresponding to the same ONT may be set simultaneously equal to zero. Although the assumption about the loss introduced at the ONT is unlikely to be true, the assumption may be used as a compromise to separate the individual value of the excess loss parameter corresponding to the OLT 210 and the individual values of the excess loss parameters corresponding to the remaining ONTs.

By assuming that one of the N ONTs may introduce no or an insignificant loss in the PON topology model 200B, the individual value of the excess loss parameter corresponding to the OLT 210 may be found equal to about the sum of the actual loss introduced at the OLT 210 and the actual loss introduced at the ONT. On the other hand, the individual values of the excess loss parameters corresponding to the remaining ONTs may be found equal to about the actual losses introduced at the ONTs. For example, in FIG. 2B, the value of the excess loss parameter corresponding to ONT 250 may be set equal to zero. The individual value of the excess loss parameter that corresponds to the OLT 210 may then be found equal to $(EL_0+EL_3)$, and the individual values of the excess loss parameters corresponding to ONT 230, ONT 240, and ONT 260 may be found equal to $EL_1$, $EL_2$, and $EL_n$, respectively.

Figure 3:
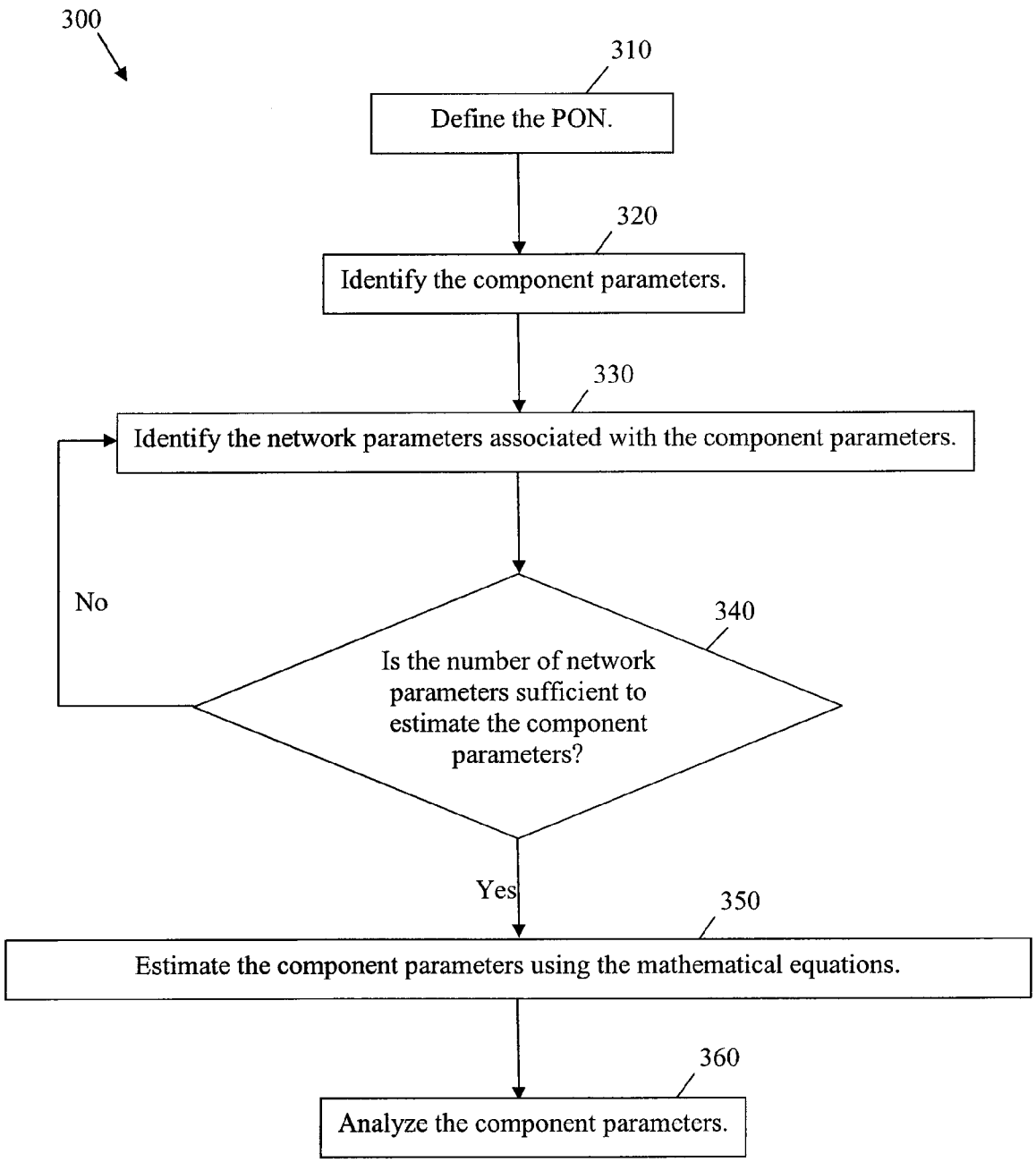
FIG. 3 is a flowchart of an embodiment of a PON topology estimation method.

FIG. 3 illustrates an embodiment of a method 300 for estimating the PON topology model. The method 300 may be implemented at the PON topology estimator in the OLT, or other PON component such as one of the ONTs. At block 310, the method 300 may identify the PON topology. The PON topology may be any of the PON topologies described above. At block 320, the method 300 may identify the unknown component parameters assigned within the PON topology. At block 330, the method 300 may identify the network parameters that are measurable within the PON topology. At block 340, the method 300 may verify whether the number of PON network parameters is sufficient to obtain the values of the component parameters. Specifically, the method 300 may determine the number of network parameters needed to obtain the values of the component parameters. The method 300 may return to block 330 until the number of network parameters is greater than or equal to the number of component parameters.

The method 300 may proceed to block 350 when the condition at block 340 is met. At block 350, the method 300 may determine the values for the component parameters using the mathematical equations from the PON topology model. The mathematical equations may comprise a system of mathematical equations that relates the component parameters to the network components. The method 300 may process the mathematical equations to solve the values of the component parameters. The mathematical equations may be processed using a computer processor, for example, to solve the system of mathematical equations. The computer processor may implement different standard solution methods to solve the system of mathematical equations. At block 360, the method 300 may analyze the component parameters to identify properties, operational aspects, or problems in separate components of the PON.

In some embodiments, the network components values in the mathematical equations may be more sensitive to some of the component parameter values than the remaining component parameter values. For instance, the fiber length parameter values or the fiber loss-per-unit-length parameter values may have more impact on the path loss measurement values than the excess loss parameter values corresponding to the ONTs. The component parameters that may have more impact on the network components or some of the network components may be assigned more weight in the mathematical equations to establish a more accurate relationship between the component parameters and the network components. The mathematical equations comprising the more accurate relationship between the component parameters and the network components may be processed to solve the component parameter values with more accuracy.

Figure 4:
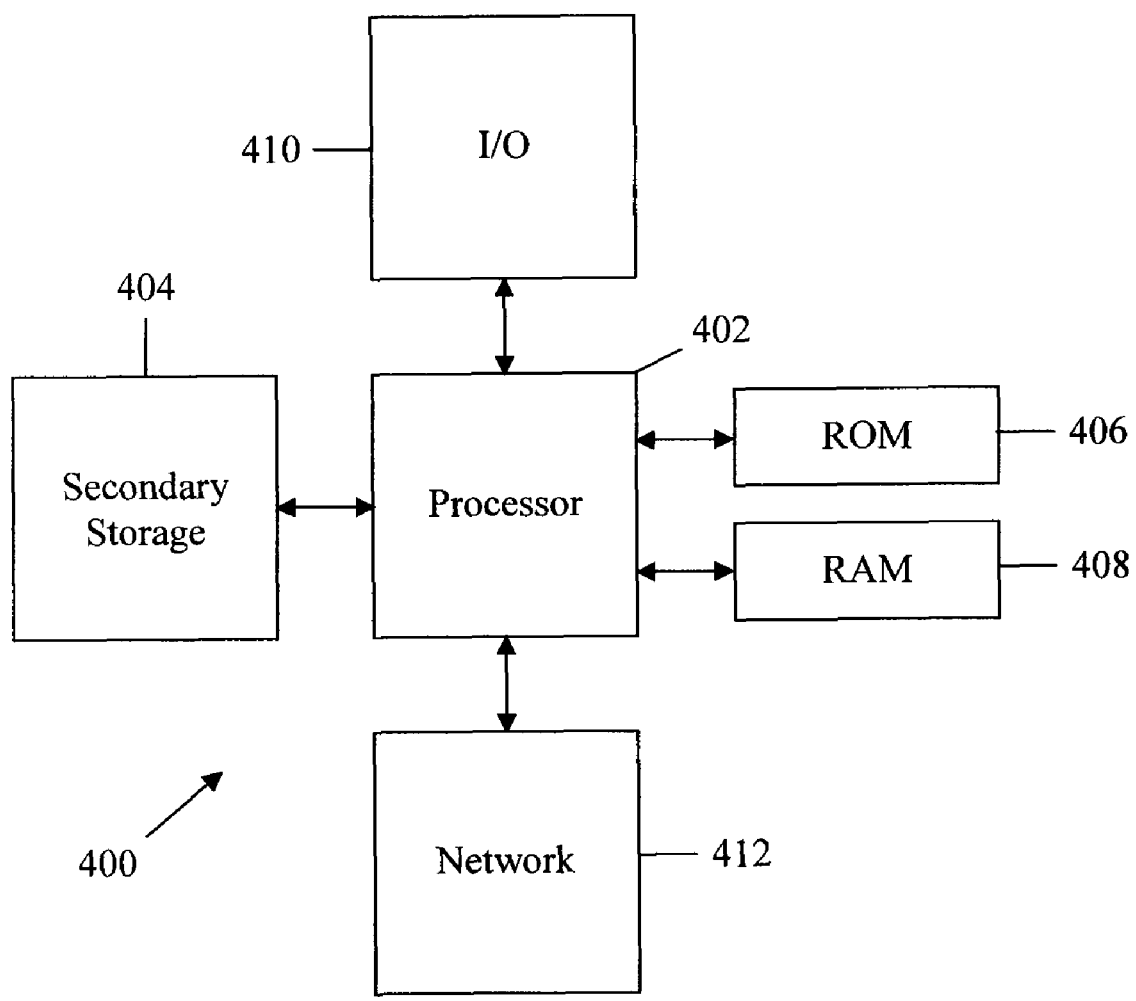
FIG. 4 is a schematic diagram of one embodiment of a general-purpose computer system.

The network described above may be implemented on any general-purpose network component, such as a computer or network component with sufficient processing power, memory resources, and network throughput capability to handle the necessary workload placed upon it. FIG. 4 illustrates a typical, general-purpose network component suitable for implementing one or more embodiments of a node disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an optical line terminal (OLT) in communication with a plurality of optical network terminals (ONTs) via an optical distribution network (ODN); and
   a passive optical network (PON) topology estimator coupled to the OLT or at least one of the ONTs, wherein the PON topology estimator is configured to model a PON topology,
   wherein the model comprises a plurality of network parameters, a plurality of component parameters, and at least one relationship between the network parameters and the component parameters, and
   wherein the PON topology represents the physical connectivity of optical fiber cables, couplers, splitters, distributors, or combinations thereof in the optical distribution network.

2. The apparatus of claim 1, wherein the network parameters are measurable and the component parameters are not measurable.

3. The apparatus of claim 1, wherein the network parameters comprise at least one path loss between the OLT and one of the ONTs.

4. The apparatus of claim 1, wherein the network parameters comprise at least one roundtrip distance between the OLT and one of the ONTs.

5. The apparatus of claim 1, wherein the component parameters comprise at least one excess loss in a downstream signal in a fiber directly connected to the OLT and at least one excess loss in an upstream signal in the, fiber.

6. The apparatus of claim 1, wherein the component parameters comprise at least one excess loss in a downstream signal in a fiber directly connected to one of the ONTs and at least one excess loss in an upstream signal in the fiber.

7. The apparatus of claim 1, wherein the component parameters comprise an excess loss at the OLT and at each ONT.

8. The apparatus of claim 1, wherein the relationship comprises:

$$Ld_i = Fd(L_0+L_i)+EL_0+EL_i,$$

$$Lu_i = Fu(L_0+L_i)+EL_0+EL_i, \text{ and}$$

$$D_i = 2(L_0+L_i),$$

wherein $Ld_i$ is a path loss between the OLT and one of the ONTs for downstream transmissions, $Lu_i$, is a path loss between the OLT and one of the ONTs for upstream transmissions, Di is a roundtrip distance between the OLT and one of the ONTs, Fd is a fiber loss-per-unit-length for downstream transmissions, Fu is a fiber loss-per-unit-length for upstream transmissions, $L_0$ is a length of a fiber directly connected to the OLT, $L_i$ is a length of a fiber directly connected to one of the ONTs, $EL_0$ is an excess loss in the OLT, and $EL_i$; is an excess loss in one of the ONTs.

9. The network of claim 1, wherein the PON topology comprises a plurality of levels.

10. An apparatus comprising:
at least one processor configured to:
define a passive optical network (PON) topology comprising a plurality of network parameters, a plurality of component parameters, and at least one relationship between the network parameters and the component parameters;
acquire values for the network parameters; and
determine the component parameters using the network parameters and the relationship between the network parameters and the component parameters,
wherein the PON topology represents the physical connectivity of optical fiber cables, couplers, splitters, distributors, or combinations thereof in the optical distribution network.

11. The apparatus of claim 10, further comprising analyzing wherein the processor is further configured to analyze the component parameters to identify a problem in the PON.

12. The apparatus of claim 10, wherein the component parameters are determined using a least error solution.

13. The apparatus of claim 10, wherein the processor is further configured to assign a plurality of weights to the component parameters.

14. The apparatus of claim 10, wherein the quantity of network parameters is greater than or equal to the quantity of the component parameters.

15. A method comprising:
modeling a passive optical network (PON) topology by a PON topology estimator coupled to an optical line terminal (OLT) or at least one of a plurality of optical network terminals (ONTs); defining a model for a passive optical network (PON) topology; defining a plurality of network parameters in the model that represent a plurality of measurable aspects of the PON; defining a plurality of component parameters in the model that are not measurable within the PON; and defining the relationship between the network parameters and the component parameters, wherein the network parameters are acquired for a first wavelength for downstream transmissions within the PON, and wherein the PON comprises optical fiber cables, couplers, distributors, or combinations thereof.

16. The method of claim 15, wherein one component parameter and at least one other component parameter are not determined separately using the network parameters and the relationship between the network parameters and the component parameters.

17. The method of claim 15, wherein at least one component parameter is set equal to zero to determine separately the remaining component parameters using the network parameters and the relationship between the network parameters and the component parameters.

18. The method of claim 15, wherein the component parameters are determined separately using the network parameters and the relationship between the network parameters and the component parameters to identify separate problems in the PON.

* * * * *

UNITED STATES PATENT AND TRADEMARK OFFICE
CERTIFICATE OF CORRECTION

| | | |
|---|---|---|
| PATENT NO. | : 7,894,362 B2 | Page 1 of 1 |
| APPLICATION NO. | : 12/027389 | |
| DATED | : February 22, 2011 | |
| INVENTOR(S) | : Frank J. Effenberger | |

It is certified that error appears in the above-identified patent and that said Letters Patent is hereby corrected as shown below:

Column 12, line 63 (Claim 5, line 4) should read: loss in an upstream signal in the fiber.

Signed and Sealed this
Twelfth Day of April, 2011

David J. Kappos
*Director of the United States Patent and Trademark Office*